US009072039B2

(12) United States Patent
Hu et al.

(10) Patent No.: US 9,072,039 B2
(45) Date of Patent: Jun. 30, 2015

(54) SYSTEM AND METHOD FOR MOBILE ACCESS CONTROL AND LOAD BALANCING IN A RELAY NETWORK (75) Inventors: Rose Qingyang Hu, Allen, TX (US); Yi Yu, Irving, TX (US); Zhijun Cai, Euless, TX (US)

(73) Assignee: BlackBerry Limited, Waterloo, Ontario (CA)

(*) Notice: Subject to any disclaimer, the term of this patent is extended or adjusted under 35 U.S.C. 154(b) by 110 days.

(21) Appl. No.: 13/637,478

(22) PCT Filed: Jul. 29, 2010

(86) PCT No.: PCT/US2010/043669
§ 371 (c)(1),
(2), (4) Date: Sep. 26, 2012

(87) PCT Pub. No.: WO2012/015411
PCT Pub. Date: Feb. 2, 2012

(65) Prior Publication Data
US 2013/0021962 A1      Jan. 24, 2013

(51) Int. Cl.
| H04B 7/14 | (2006.01) |
| H04W 48/20 | (2009.01) |
| H04B 7/26 | (2006.01) |
| H04W 28/08 | (2009.01) |
| H04W 48/06 | (2009.01) |
| H04W 48/12 | (2009.01) |
| H04W 84/04 | (2009.01) |

(52) U.S. Cl.
CPC ............. *H04W 48/20* (2013.01); *H04B 7/2606* (2013.01); *H04W 28/08* (2013.01); *H04W 48/06* (2013.01); *H04W 48/12* (2013.01); *H04W 84/047* (2013.01)

(58) Field of Classification Search
CPC .... H04B 7/2606; H04W 28/08; H04W 48/06; H04W 48/12; H04W 48/20
See application file for complete search history.

(56) References Cited

U.S. PATENT DOCUMENTS

| 8,185,152 B1 * | 5/2012 | Goldner ..................... 455/552.1 |
| 2007/0201540 A1 * | 8/2007 | Berkman ..................... 375/219 |
| 2009/0197603 A1 * | 8/2009 | Ji et al. .......................... 455/436 |

(Continued)

FOREIGN PATENT DOCUMENTS

| WO | 2006138122 | 12/2006 |
| WO | 2008105771 | 9/2008 |
| WO | WO 2008105771 A1 * | 9/2008 |

OTHER PUBLICATIONS

PCT, Search Report and Written Opinion, PCT/US2010/043669, Feb. 18, 2011, 16 pgs.

(Continued)

*Primary Examiner* — Charles C Jiang
*Assistant Examiner* — Thad Defauw
(74) *Attorney, Agent, or Firm* — Fish & Richardson P.C.

(57) ABSTRACT

A method, network node and UE device (115) for wireless access control and load balancing among various access nodes (105, 110) in a radio access network that contains both base stations (105) and relay notes (110). A wireless UE device (115) receives a message containing at least one of the respective loads for a group of access nodes and weighting factors for possible connections. The device determines a preferred access node (325, 425, 525) using at least one of the respective loads and weighting factors and attaches to the preferred access node.

20 Claims, 9 Drawing Sheets

(56) References Cited

U.S. PATENT DOCUMENTS

2010/0311452 A1* 12/2010 Li et al. .......................... 455/509
2011/0294531 A1* 12/2011 Buckley et al. ............... 455/515

OTHER PUBLICATIONS

Panasonic: "Study Item on LTE-Advanced", Internet Citation, Jun. 30, 2008, 6 pgs.

Research in Motion et al: "Serving Cell Selection in a Type 1 Relay Network", 3GPP Draft, R2-100409, vol. RAN WG2, Jan. 12, 2010, 4 pgs.

EPO, Publication Bibliographic Data, Application No. 10742359.2, Jun. 5, 2013, 1 pg.

EPO, Communication Pursuant to Rules 161(1) and 162 EPC, Application No. 10742359.2, Apr. 16, 2013, 2 pgs.

EPO, Communication of European Publication Number and Information on the Application of Article 67(3) EPC, Application No. 10742359.2, May 8, 2013, 1 pg.

CIPO, Office Action, Application No. 2,800,835, Jun. 18, 2014, 2 pgs.

EPO, Communication pursuant to Article 94(3) EPC, Application No. 10742359.2, Aug. 1, 2014, 5 pgs.

\* cited by examiner

SYSTEM AND METHOD FOR MOBILE ACCESS CONTROL AND LOAD BALANCING IN A RELAY NETWORK

This application is a national stage entry of PCT/US2010/043669, filed Jul. 29, 2010.

TECHNICAL FIELD

The present patent disclosure generally relates to managing wireless connections in a wireless communications network. More particularly, and not by way of any limitation, the present patent disclosure is directed to a system and method for load balancing among access nodes that include both base stations and relay nodes.

BACKGROUND

The use of mobile telephones and other wireless communication devices has increased tremendously in recent years. As the usage increases, it becomes increasingly necessary to utilize the available resources, such as bandwidth, in the most efficient manner.

BRIEF DESCRIPTION OF THE PREFERRED EMBODIMENTS

A more complete understanding of the embodiments of the present patent disclosure may be had by reference to the following Detailed Description when taken in conjunction with the accompanying drawings wherein.

DETAILED DESCRIPTION OF THE DRAWINGS

In a traditional wide area cellular network, as a wireless user equipment (UE) device moves from the vicinity of a base station to a location near the cell boundary, the spectral efficiency, i.e., the amount of data that can be carried in a given amount of bandwidth, decreases due to the path loss and the interference from adjacent cells. In order to satisfy quality of service requirements of UE devices at the cell boundary, the deployment of relay nodes (RNs) near the cell boundary is being actively considered. A critical step in achieving efficient usage in a network that includes RNs is for a wireless UE device to connect to the node that provides the best radio services whether that UE device, whether that node is a base station or a relay node. In a traditional cellular network, the UE device is usually connected to the base station whose downlink signal power is strongest or whose signal-to-interference-plus-noise ratio (SINR) is the best as determined at the wireless UE device, as well as being connected to the same base station on both downlink and uplink. In a relay-augmented network, the same UE device attachment scheme may not be optimal for a number of reasons:

The base stations generally transmit at a higher power than the relay nodes. In a heterogeneous network using the traditional downlink-based scheme the majority of the UE devices would associate with the BS due to its relatively high transmit power. The wireless UE devices may not efficiently utilize the additional resources that the RNs provide due to their lower transmission power.

If a wireless UE device is associated with a relay node, both downlink and uplink signals have to traverse multiple wireless hops, with each hop having a different level of quality. When the selection of the best connection for a UE device is based solely on the relative quality of the connection between the wireless UE device and the base station versus the connection between the wireless UE device and the relay node, the comparison ignores the quality of the connection between the relay node and the base station.

If a UE device is connected to a node that has the best overall channel quality, but the node does not have enough resources to support the traffic, the UE device performance can be aversely affected.

Additionally, at least some of the wireless UE devices associated with a base station would be better served by a connection to a relay node on the uplink due to smaller path loss to the relay nodes. In one scheme that has been proposed, a wireless UE device is connected to the access node that has the smallest path loss. However this path-loss-based association scheme may not provide a good downlink connection as the UE devices connected to relays in this way could experience strong interference from base stations on the downlink.

Rather than optimizing UE device access to the radio access network to maximize the received signal at the wireless UE device, the disclosed embodiments provide a method, network node, user equipment (UE) device and computer program product for controlling UE device access and balancing the load across multiple access nodes that include both base stations and relay nodes in order to maximize the number of wireless UE devices the network is able to serve.

In one embodiment of the disclosure, a wireless user equipment (UE) device includes a component configured to receive a message that includes at least one of respective loads for a plurality of access nodes and weighting factors for a plurality of possible connections, the plurality of access nodes including at least one base station and at least one relay node. The UE device further includes a component configured to determine a preferred access node using the at least one of respective loads and weighting factors and a component configured to attach to the preferred access node.

In one embodiment of the disclosure, a method operable on a wireless user equipment (UE) device includes receiving a message that contains at least one of respective loads for a plurality of access nodes and weighting factors for a plurality of possible connections, the plurality of access nodes including at least one base station and at least one relay node. The method further includes determining a preferred access node using the at least one of respective loads and weighting factors and attaching to the preferred access node.

In one embodiment of the disclosure a computer program product stored on a computer-readable media and operable for execution on a wireless user equipment (UE) device includes instructions for receiving a message that contains at least one of respective loads for a plurality of access nodes and weighting factors for a plurality of possible connections, the plurality of access nodes including at least one base station and at least one relay node. The computer program further contains instructions for determining a preferred access node using the at least one of respective loads and weighting factors and instructions for attaching to the preferred access node.

Figure 1A:
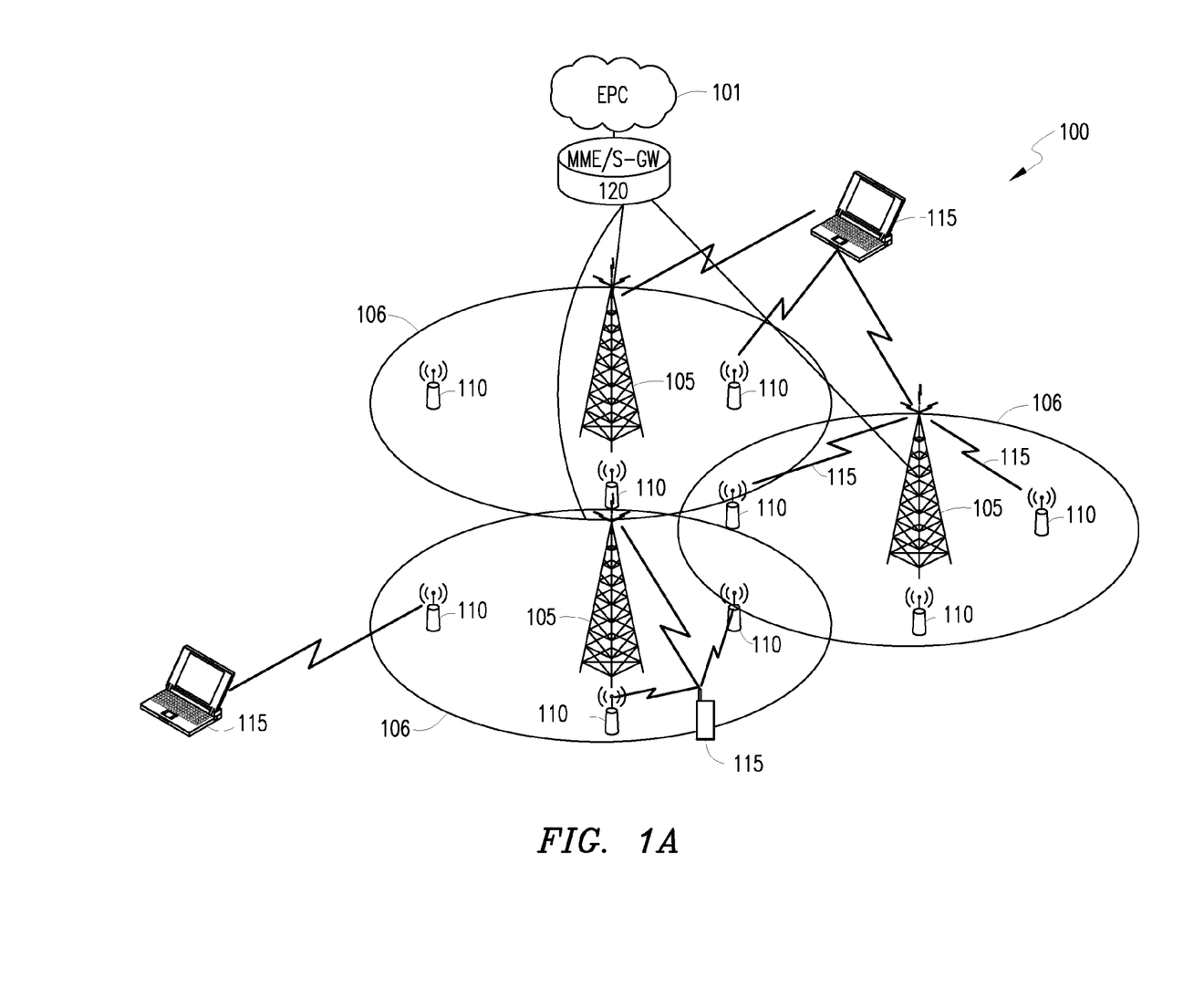
FIG. 1A depicts an example network in which an embodiment of the present disclosure can be practiced.

Referring now to the drawings, and more particularly to FIG. 1A, an embodiment of a radio access network (RAN) 100 connected to core communication network 101 is shown wherein one or more embodiments of the present patent disclosure can be practiced to perform load balancing among the radio access nodes. The core network, embodied in this figure as Evolved Packet Core (EPC) 101, may comprise one or more core networks providing one or both of voice and data communication. Communication network 101 may further include connection to the Public Switched Telephone Network (PSTN), to various service providers such as the Internet and to other communication networks (none of which are specifically shown). As illustrated, radio access network 100 comprises a Long Term Evolution-Advanced (LTE-A) access network, although those skilled in the art will recognize that the LTE-A network could be any other radio technology including but not limited to: WiMax, UMTS (Universal Mobile Telecommunications System), CDMA2000, TDMA, Wi-Fi, etc. The LTE-A radio access infrastructure is based on Evolved Universal Mobile Telecommunications System (UMTS) Terrestrial Radio Access Network (E-UTRAN) that includes a number of enhanced NodeBs (eNBs) 105, that communicate with UE devices 115 using multiple bands that are dynamically assigned. Each eNB 105 serves a corresponding cell or sector 106. At appropriate distances from the eNB 105, a number of relay nodes (RNs) 110 are associated with at least some of eNBs 105. Although only three RNs are shown for each eNB in this figure, it should be understood that this illustration is necessarily simplified and does not provide any limitation to the RNs associated with an eNB. Both eNBs 105 and RNs 110 interface with LTE-compliant UE devices 115. RAN 100 further comprises Mobility Management Entity (MME)/Serving Gateway (S-GW) node 120. The mobility management entity is a control node for LTE-A RAN 100 and manages idle mode tracking, paging procedures and user authentication. The serving gateway routes and forwards user data packets and acts as the mobility anchor during eNB handover. MME/S-GW 120 connects the eNBs 105 to the EPC 101. The eNBs 105 are usually connected to each other in order to perform handoff of UE devices as these devices move from one region to another and to communicate with each other in order to periodically share information about signal conditions and load on the eNBs and RNs (not specifically shown). When a direct connection between eNBs is not available, these nodes can still communicate via the MME/S-GW 120 for handover.

In an LTE-A embodiment, the radio access technology used is orthogonal frequency-division multiplexing (OFDM) on the downlink and Single Carrier Frequency Division Multiple Access (SC-FDMA) for the uplink. As is known, LTE-A supports both time division multiplexing (TDM) and frequency division multiplexing (FDM). Accordingly, in the disclosed embodiment, an eNB 105 and the RNs 110 associated with that eNB 105 are able to utilize the same frequency bands, i.e., these access nodes employ full frequency reuse. Additionally in the disclosed embodiment, the relay network uses inband wireless backhaul, i.e., the communication between the eNB and associated RNs on both uplink (UL) and downlink (DL) communication is not only wireless, but also takes place within the same frequency bands as the communication between the eNB and the UE device. In one embodiment, each of RNs 110 use TDM to share the same frequency band between connections to attached UE devices 115 and the RN's backhaul connection to the eNB on both UL and DL. In the same embodiment the eNB will split its bandwidth between UE devices directly associated with the eNB and the wireless backhaul to each of the RNs using both FDM and TDM. The resource reuse permits the eNBs and RNs to use the same resource, which can raise spectral efficiency and cell throughput.

In at least one embodiment of the disclosed method of load balancing, wireless UE devices that are idle are operable to receive broadcast information from the eNB regarding current load at available eNBs and RNs and to perform the algorithm for load balancing across the access nodes. In at least one embodiment of the disclosed method of load balancing, load balancing of active UE devices is either performed by the eNB 105 or distributed between the eNB and the wireless UE devices 115.

Figure 2:
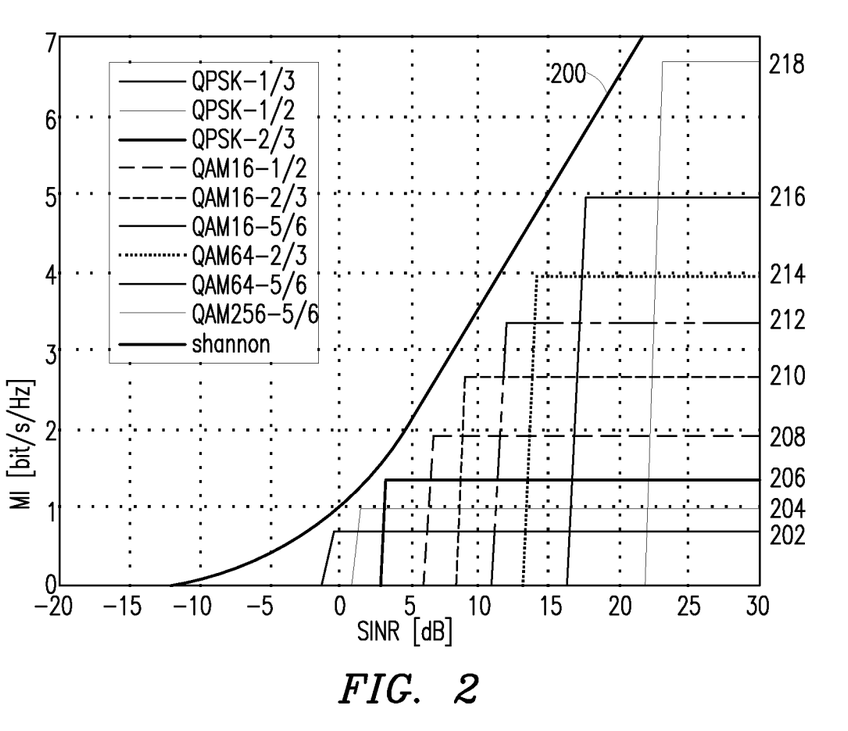
FIG. 2 depicts a graph showing the relationship between SINR value and data rate.

In the disclosed embodiments, load balancing between the available eNBs and RNs is based at least in part on the amount of resources that is consumed by a wireless UE device. The unit of resource can be a resource block, a sub-carrier, or hertz (Hz). For simplicity, the unit used in this application is Hz, which is equal to one cycle per second, while the values given are in MHz. The correlation between the quality of a signal and the amount of information the signal can carry is illustrated in FIG. 2. Plot 200 represents the channel capacity plotted against SINR using the known Shannon formula, which gives an optimistic performance evaluation, while the plots to the right represent channel capacity as taken from the modulation and code scheme (MCS) table for a given system. A notable characteristic of LTE is the ability to modify the modulation and coding rate used according to the existing quality of the channel. In this figure, plots 202, 204 and 206 represent the use of quadrature phase shift keying (QPSK) with coding rates of 1/3, 1/2 and 2/3 respectively and plots 208-218 represent the use of quadrature amplitude modulation (QAM) having constellation orders, of 16, 64 and 256 respectively at coding rates of 1/2, 2/3, 5/6, 2/3, 5/6 and 5/6 respectively.

In the embodiment shown in FIG. 1A, frequency reuse means that each relay node contains the same total resources as the base station with which the relay node is associated. A relay node must allocate available resources among the wireless UE devices attached to the RN. Similarly, the base station must allocate its available resources between the wireless UE devices attached directly to the base station and the backhaul connection to each of the RNs. A wireless UE device 115 that is attached directly to base station 105 will only consume resources from the base station, but if the same wireless UE device is attached to an RN, the UE device will not only consume resources from the RN, but also the resource from the base station for the backhaul communication, although the resources consumed from the BS will generally be much less, due to the generally higher quality of the backhaul connection as compared to the connection between the BS and a UE device near the boundary of the coverage area.

Figure 1B:
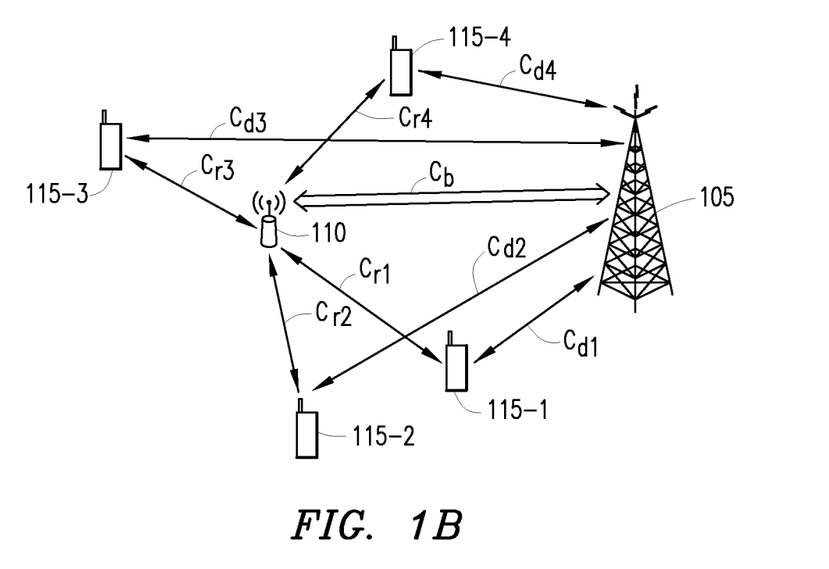
FIG. 1B depicts an example relationship between a base station, a relay node and nearby UE devices.

With reference now to FIG. 1B, a simple example of the problem of load balancing is discussed, using a single eNB 105 and a single RN 110 associated with the eNB. Each of wireless UE devices 115-1, 115-2, 115-3, 115-4 is able to attach to either base station 105 or to RN 110. In the example shown, the maximum amount of system resources for a sector is C. $C_{di}$ represents the bandwidth needed if UE device 115-$i$ is connected to eNB 105; $C_{ri}$ represents the bandwidth needed if UE device 115-$i$ is connected to RN 110; and $C_b$ represents the bandwidth needed on the wireless backhaul in order to support a UE device. For simplicity, we assume that the UE devices in the example request the same service so that $C_b$ is the same for all of the UE devices, while $C_{di}$ and $C_{ri}$ are different among different UE devices depending on the individual channel conditions. For simplicity, the unit used in the given example is MHz so that the unit will not be further mentioned. Table 1 below shows the value for all $C_{di}$, $C_{ri}$ and $C_b$. Once a user's location is determined and a data rate is given, these numbers will be known as inputs for association.

TABLE 1

|  | Variable | Value (MHz) |
|---|---|---|
| Backhaul | $C_b$ | 0.05 |
| UE Device 115-1 | $C_{d1}$ | 0.3 |
|  | $C_{r1}$ | 0.5 |
| UE Device 115-2 | $C_{d2}$ | 0.35 |
|  | $C_{r2}$ | 0.5 |
| UE Device 115-3 | $C_{d3}$ | 0.6 |
|  | $C_{r3}$ | 0.4 |
| UE Device 115-4 | $C_{d4}$ | 0.4 |
|  | $C_{r4}$ | 0.7 |

If association of a UE device is based on the best SINR, which is widely used in a traditional cellular network, FIG. 1B implies, from downlink signal strength, that UE devices 115-1, 115-2 and 115-4 will prefer to associate with the eNB while UE device 115-3 will prefer to associate with the RN. In this example, the total bandwidth request for UE devices 115-1, 115-2 and 115-4 to the eNB will be 0.3+0.35+0.4=1.05, which is larger than the total available bandwidth C of the eNB. Then either one of the UE devices is rejected or one UE device is redirected to the RN. If the best two UE device connections to the BS are retained and the worst connection is redirected to the relay, UE devices 115-1 and 115-2 stay with the eNB and consume 0.3+0.35=0.65 bandwidth of the eNB, which leaves 0.35 available bandwidth at the eNB. UE devices 115-3 and 115-4 will need to be associated with the relay. UE device 115-3 will consume 0.4 from RN 110 and 0.05 from the wireless backhaul, so this UE device can be granted access and leave 1−0.4−0.05=0.55 available bandwidth at the RN and 0.35−0.05=0.3 available at the eNB. UE device 115-4 consumes 0.7 from the RN and 0.05 from the eNB, which exceeds the available bandwidth of the RN so UE device 115-4 has to be rejected.

If, instead of letting the UE devices associate with the access node having the best received signal strength, load balancing can associate UE devices in a more efficient manner with regard to the use of system resources. For UE device 115-1, although its best SINR node is the eNB, the UE device can be associated with the RN, together with UE device 115-3. These two UE devices in total consume 0.5+0.4=0.9 from the RN and 0.05+0.05=0.1 from the wireless backhaul. This association leaves 0.1 available for the relay and 0.9 for the eNB, so that both UE devices 115-1 and 115-3 can be granted access to the RN. UE devices 115-2 and 115-4 con- sume in total 0.75 from the eNB, which still has 0.9 to offer after UE devices 115-1 and 115-3 are associated with the RN, so both UE devices 115-2 and 115-4 can be associated with the eNB. Therefore, in this scheme, all of the UE devices could be granted access to the network. The final association decision for the two mechanisms can be shown in Table 2.

TABLE 2

| UE device | Best signal association | Load balance association |
|---|---|---|
| 115-1 | eNB | RN |
| 115-2 | eNB | eNB |
| 115-3 | RN | RN |
| 115-4 | rejected | eNB |

Following are systematic models for the disclosed method of UE device access control and load balancing.

Theoretically speaking, an optimal solution to load balancing across a RAN would look at every wireless UE device attached to the RAN, figure the resources consumed by every possible combination of attachments of the UE devices to the RNs and BSs and select the best combination. Practically speaking, the optimal solution requires far too much computing capacity and time, especially when the rapidly changing nature of the overall system is considered, both in terms of the mobility of the wireless UE devices and in terms of the constantly changing signal quality across the system. Disclosed herein are three embodiments of a practical method of load balancing. Each of these embodiments assumes the use of full frequency reuse within a sector and in-band wireless backhaul between the base station and each of the associated relay nodes. Given these assumptions, for a UE device i in the network, the SINR from the BS in sector k is defined as $SINR_{d\_i\_k}$ and the SINR from relay j within sector k is defined as $S/NR_{a\_i\_j\_k}$. The backhaul connection SINR between relay j and BS k for UE device i is $S/NR_{b\_i\_j\_k}$. The corresponding bandwidth requirement for each of the above three connections is the SINR to bandwidth conversion based on the table shown in FIG. 2. As is known, in an inband relay network, the resource bottleneck is usually the wireless backhaul, so the goal of the resource allocation is usually to avoid consuming the wireless backhaul resources unnecessarily. All the relays in a given sector, or cell, will utilize resources on the backhaul from the same base station while the access connection for each relay node can reuse the same resources among each other. From this perspective, if a sector contains six relays, the total relay access connections could have up to 6*C resources while the total backhaul can only have up to C resources, where C is the total bandwidth. Three resource sets, $\Psi_{1 0k}$, $\Psi_{2jk}$ and $\Psi_{3jk}$, are defined to represent the resources taken respectively by UE devices directly connected to the base station in sector k, by UE devices connected to a relay node j within sector k, and by the backhaul connections between relay node j and base station k. In addition, the amount of resources available at a node in sector k at time t is defined as $\Omega_{jk}(t)$, where j represents the access node, with j=0 representing the BS.

Figure 3:
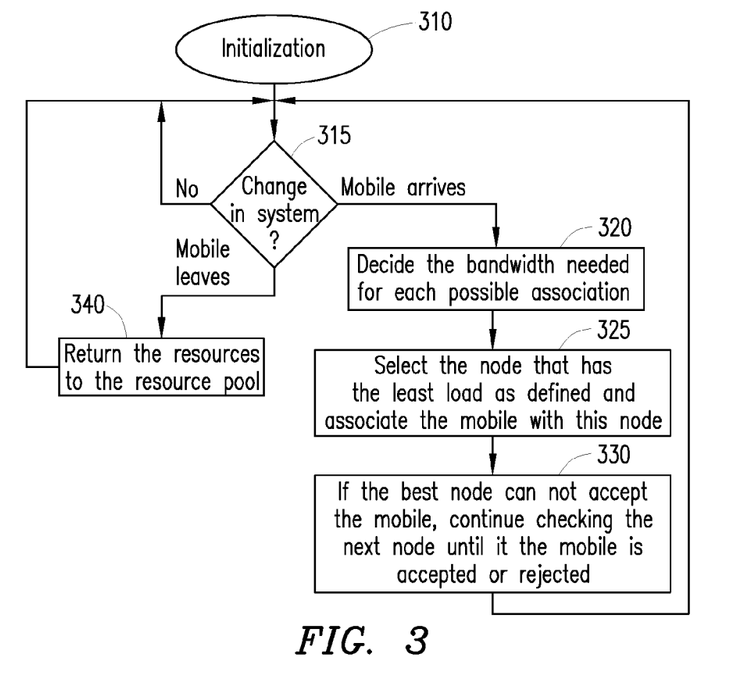
FIG. 3 depicts a flowchart for managing UE device access and load balancing in a radio access network according to an embodiment of the present disclosure.

With reference now to FIG. 3, a first embodiment of a method of performing load balancing is disclosed. In this embodiment, the method looks at the associations possible for a given wireless UE device, and then associates the UE device with the base station or relay node with the least load. The method begins with initialization of the system at 310. As the initialization process does not affect the load balancing method, no details are included herein. At 315, a determination is made whether a change has occurred in the system, such as the arrival or departure of a wireless UE device. If no change has occurred, the method waits until time to check again. When a wireless UE device enters an area, e.g., powers up, requests a new service or moves into the area, a determination is made as to the possible association points, i.e. the base stations and relay nodes from which the UE device is able to receive signals, the bandwidth necessary for each association, and any weighting factors applied to the connections at 320. The weighting factors can be applied only to the backhaul connections, as shown in the mathematical calculations below, or to any combination of backhaul connections, connections to the UE device from the base station and connections to the UE device from the relay node. In the present embodiment, the access node that currently has the least load is selected and the wireless UE device is associated with the selected node at 325. If the selected node is not able to accept the UE device, the method will continue checking the next best node until the UE device is either accepted by a node or no access is currently possible at 330. The method then returns to 315 to wait for the next change to the system. If the change at 315 is a UE device leaving the area, the resources used by the UE device are returned to the appropriate resource pool(s) for use by other devices at 340 and the method returns to 315.

For the least load embodiment of FIG. 3, the following details are provided for the algorithm used to achieve the fair load distribution among the nodes:

1) At time t=0 the BS in sector k has an available bandwidth of $\Omega_{0k}(0)=C_1$. Relay node j in sector k has an available bandwidth of $\Omega_{jk}(0)=C_2$, for each relay node j=1, ..., $M_r$ and each sector k=1, ..., $M_c$. The resource sets representing resources in use at time t=0 are $\Psi_{10k}(0)=\Psi_{2jk}(0)=\Psi_{3jk}(0)=0$, for each RN j=1, ..., $M_r$ and each sector k=1, ..., $M_c$.

2) Decide how much bandwidth it may take if UE device i is associated to node j within sector k, for each access node j=0, ..., $M_r$ and each sector k=1, ..., $M_c$ that the UE device is able to receive a signal from.
   a. Assume UE device i will associate with node 0 (i.e., the BS) in sector k. If the necessary resources are available, i.e., $\Omega_{0k}(t)-C_{d\_i\_k}\geq 0$, set the new resource usage at this node to reflect the added bandwidth, i.e., $\delta_{0k}=\Psi_{10k}(t)+C_{d\_i\_k}$; otherwise set $\delta_{0k}$ to a large value $\Theta$.
   b. Assume UE device i will associate with RN j in sector k. If the necessary backhaul resources are available at the BS, i.e., $\Omega_{0k}(t)-C_{b\_i\_j\_k}\geq 0$, and the necessary resources at the relay node are available for both the connection to the UE device and for the backhaul, i.e., $\Omega_{jk}(t)-C_{a\_i\_j\_k}-C_{b\_i\_j\_k}\geq 0$, set the new resource usage at this node to reflect the added bandwidth, i.e., $\delta_{jk}=(\Psi_{2jk}(t)+C_{a\_i\_j\_k})/M+(\Psi_{3jk}(t)+C_{b\_i\_j\_k})$; otherwise set $\delta_{jk}$ to a large value $\Theta$. In this equation, M represents a general scaling factor that can be tweaked to achieve the maximal capacity gain.

3) Let $(J,K)=\arg\min(\delta_{jk})$ for each access node j=0, ..., $M_r$ and sector k=1, ..., $M_c$ and $\zeta=\min(\delta_{jk})$ for each access node j=0, ..., $M_r$ and sector k=1, ..., $M_c$, i.e. (J,K) is the node that would have the least load and is the load at that node.
   a. If $\zeta<\Theta$, the UE device is granted access.
      i. If J=0, the UE device is associated with the BS in sector K; the system would then update the variables $\Omega_{0K}(t+1)=\Omega_{0K}(t)-C_{d\_i\_K}$ and $\Psi_{10K}(t+1)=\Psi_{10K}(t)+C_{d\_i\_K}$.
      ii. If J>0, the UE device is associated with RN J within sector K; the system then updates the variables:

$$\Omega_{0K}(t+1)=\Omega_{0K}(t)-C_{b\_i\_J\_K};$$

$$\Omega_{JK}(t+1)=\Omega_{JK}(t)-C_{a\_i\_J\_K}-C_{b\_i\_J\_K};$$

$$\Psi_{0K}(t+1)=\Psi_{0K}(t)+C_{b\_i\_J\_K};$$

$$\Psi_{2JK}(t+1)=\Psi_{2JK}(t)+C_{a\_i\_J\_K}+C_{b\_i\_J\_K}.$$

b. If $\zeta=\Theta$, the UE device is rejected.

Figure 4:
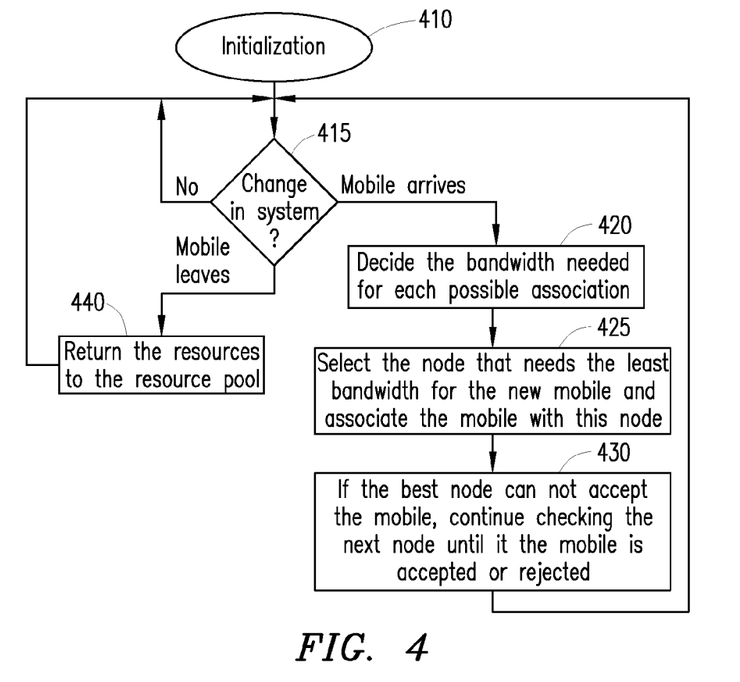
FIG. 4 depicts a flowchart for managing UE device access and load balancing in a radio access network according to an embodiment of the present disclosure.

With reference now to FIG. 4, a second embodiment of a method for access control and load balancing is described. This embodiment looks at the associations possible for a given wireless UE device and associates the UE device with the base station or relay node that requires the least resources to serve the UE device. This method again begins with initialization of the system at 410. At 415, a determination is made whether a change has occurred in the system, which may be the arrival or departure of a wireless UE device. If no change has occurred, the method waits until time to check again. When a wireless UE device enters an area, a determination is made as to the possible association points for the UE device, the bandwidth necessary for each association, and any weighting factors applied to the connections, at 420. As in the previous example, the weighting factors can be applied to any combination of backhaul connections, connections to the UE device from the base station and connections to the UE device from the relay node. In this embodiment, the association point that requires the least bandwidth to serve the UE device is selected and the wireless UE device is associated with the selected node at 425. If the selected node is not able to accept the UE device, the method will continue checking the next best node until the UE device is either accepted by a node or no access is currently possible at 430. The method then returns to 415 to wait for the next change to the system. If the change at 415 is a UE device leaving the area, the resources used by the UE device are returned to the appropriate resource pool for use by other devices at 440 and the method returns to 415.

In this second embodiment, the algorithm takes the following form:

1. At time t=0 the BS in sector k has an available bandwidth of $\Omega_{0k}(0)=C_1$. Relay node j in sector k has an available bandwidth of $\Omega_{jk}(0)=C_2$, for each relay node j=1, ..., $M_r$ and each sector k=1, ..., $M_c$. Again, the resource sets representing resources in use at time t=0 are $\Psi_{10k}(0)=\Psi_{2jk}(0)=\Psi_{3jk}(0)=0$, for each j=1, ..., $M_r$ and each k=1, ..., $M_c$.

2. Decide how much bandwidth it may take if UE device i is associated to node j within sector k, for each access node j=0, ..., $M_r$ and each sector k=1, ..., $M_c$ that the UE device is able to receive a signal from.
   a. Assume UE device i will associate with node 0 (i.e., the BS) in sector k. If the necessary resources are available, i.e., $\Omega_{0k}(t)-C_{d\_i\_k}\geq 0$, set the resources needed at this node $\delta_{0k}=C_{d\_i\_k}$; otherwise set $\delta_{0k}$ to a large value $\Theta$.
   b. Assume UE device i will associate with RN j in sector k. If the necessary backhaul resources are available at the BS, i.e., $\Omega_{0k}(t)-C_{b\_i\_j\_k}\geq 0$, and the necessary resources at the relay node are available for both the connection to the UE device and for the backhaul, i.e., $\Omega_{jk}(t)-C_{a\_i\_j\_k}-C_{b\_i\_j\_k}\geq 0$, set the necessary resources for this node, $\delta_{jk}=C_{a\_i\_j\_k}/M+C_{b\_i\_j\_k}$; otherwise set $\delta_{jk}$ to a large value $\Theta$. Again, the value M represents a general scaling factor that can be tweaked to achieve the maximal capacity gain.

3) Let $(J,K)=\arg\min(\delta_{jk})$ for each access node $j=0, \ldots, M_r$ and sector $k=1, \ldots, M_c$ and $\zeta=\min(\delta_{jk})$ for each access node $j=0, \ldots, M_r$ and sector $k=1, \ldots, M_c$, i.e. $(J,K)$ is the access node that requires the least bandwidth and $\zeta$ is the required bandwidth at that node.

a. If $\zeta<\Theta$, the UE device is granted access.

i. If $J=0$, the UE device is associated with the BS in sector K; the system would then update the variables for bandwidth available at the BS, $\Omega_{0k}(t+1)=\Omega_{0k}(t)-C_{d\_i\_K}$ and bandwidth used at the BS, $\Psi_{10k}(t+1)=\Psi_{10k}(t)+C_{d\_i\_k}$.

ii. If $J>0$, the UE device is associated with RN J within sector K; the system then updates the variables for bandwidth available at the BS, $\Omega_{0k}(t+1)=\Omega_{0k}(t)-C_{b\_i\_J\_K}$, bandwidth available at the RN, $\Omega_{JK}(t+1)=\Omega_{JK}(t)-C_{a\_i\_J\_K}-C_{b\_i\_J\_K}$; bandwidth used at the BS, $\Psi_{0k}(t+1)=\Psi_{0k}(t)+C_{b\_i\_J\_K}$ and bandwidth used at the RN, $\Psi_{2JK}(t+1)=\Psi_{2JK}(t)+C_{a\_i\_J\_K}+C_{b\_i\_J\_K}$.

b. If $\zeta \geq \Theta$, the UE device is rejected.

Compared to the least load method of FIG. 3, this embodiment is memory-less in that it does not consider what has been associated with the node already. The present embodiment makes the decision based solely on the bandwidth needed by the UE device.

Figure 5:
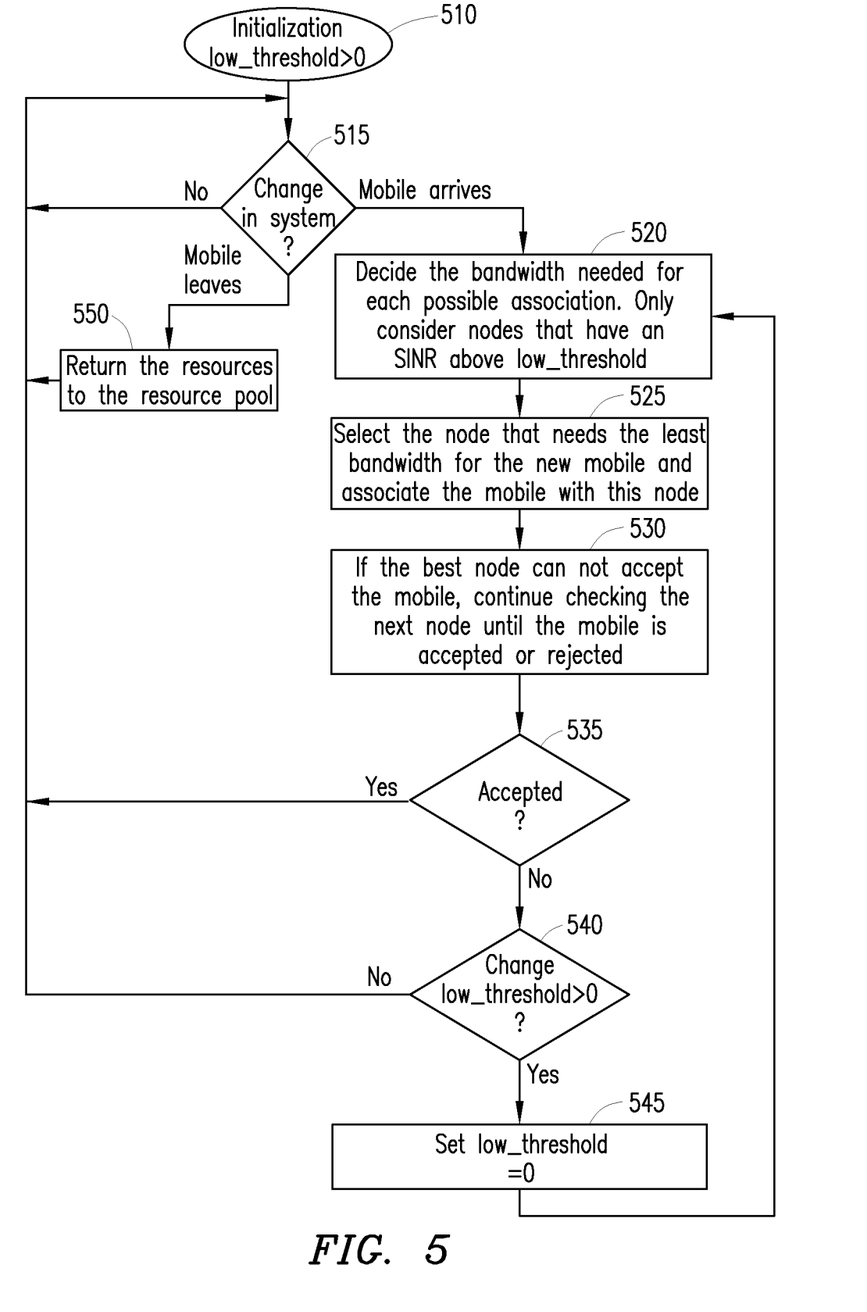
FIG. 5 depicts a flowchart for managing UE device access and load balancing in a radio access network according to an embodiment of the present disclosure.

With reference now to FIG. 5, a third embodiment of a method of performing access control and load balancing is disclosed. This embodiment is similar to the least bandwidth method of FIG. 4, but uses an association that provides at least a threshold value of SINR, if such an association is possible. Once again, the method begins with initialization of the system at 510; as part of the initialization, a low_threshold value is set as desired. At 515, a determination is made whether a change has occurred in the system, such as the arrival or departure of a wireless UE device. If no change has occurred, the method waits until time to check again. When a wireless UE device enters an area, a determination is made as to the possible association points for the UE device, the associated SINR values and any weighting factors associated with the different connections, which are then used to determine the bandwidth necessary for each association at 520. As in the previous two examples, the weighting factors can be applied to any combination of backhaul connections, connections to the UE device from the base station and connections to the UE device from the relay node. The possible associations are divided into a first set of associations having a SINR above the threshold and a second set of associations having a SINR below the threshold. Initially, only those associations having a SINR value above the threshold value are considered. The association point that requires the least bandwidth to serve the UE device is selected and the wireless UE device attempts to associate with the selected node at 525. If the selected node is not able to accept the UE device, the UE device will continue checking the next best node that has a SINR greater than the threshold until the UE device is either accepted by a node or rejected at 530. If at any point, the UE device is able to associate with a node, i.e., "Yes" to 535, the method returns to 515 to wait for the next change in the system. If the UE device was rejected by the current set of possible associations, then at 540, the method determines whether low_threshold>0. If the answer is "Yes", the method then sets low_threshold=0 at 545 and returns to 520, where the method selects the node in the current set that needs the least bandwidth to serve the UE device. The UE device attempts to associate with this node at 525. Once again, if the best node is not able to accept the UE device, the method will continue checking the next best node until the UE device is accepted or rejected for association. If the UE device is accepted at 535, the method returns to 515 to wait for the next change to the system. If the UE device is finally rejected by this set of possible associations, the method again determines whether low_threshold>0. In this instance, the answer is "No", so no association is possible at the current time and the method returns to 515 to wait for new changes. As in the earlier embodiments, if the change at 515 is a UE device leaving the area, the resources used by the UE device are returned to the appropriate resource pool for use by other devices at 550 and the method returns to 515 to wait for further changes.

In this embodiment, the algorithm takes the following form:

1) At time $t=0$, BS in sector k has an available bandwidth of $\Omega_{0k}(0)=C_1$. Relay node j in sector k has an available bandwidth of $\Omega_{jk}(0)=C_2$, for each relay node $j=1, \ldots, M_r$ and each sector $k=1, \ldots, M_c$. Again, the resource sets representing resources in use at time $t=0$ are $\Psi_{10k}(0)=\Psi_{2jk}(0)=\Psi_{3jk}(0)=0$, for each $j=1, \ldots, M_r$ and each $k=1, \ldots, M_c$.

2) Decide how much bandwidth it may take if UE device i is associated to access node j within sector k, for each access node $j=0, \ldots, M_r$ and each sector $k=1, \ldots, M_c$.

a. Assume UE device i will associate with node 0, i.e., the BS in sector k. If the necessary bandwidth at the BS is available, i.e., $\Omega_{0k}(t)-C_{d\_i\_k}\geq 0$ and the signal quality is above a threshold, i.e., $SINR_{d\_i\_k}\geq$ low_threshold, set the bandwidth needed, $\delta_{0k}=C_{d\_i\_k}$; otherwise set $\delta_{0k}$ to a large value $\Theta$.

b. Assume UE device i will associate with RN j in sector k; if the necessary bandwidth is available at the base station for the backhaul, i.e., $\Omega_{0k}(t)-C_{b\_i\_j\_k}\geq 0$ and the necessary bandwidth is available at the RN, i.e., $\Omega_{jk}(t)-C_{a\_i\_j\_k}-C_{b\_i\_j\_k}\geq 0$ and the signal quality is above a threshold, i.e., $SINR_{a\_i\_j\_k}\geq$ low_threshold, set $\delta_{jk}=C_{a\_i\_j\_k}/M+C_{b\_i\_j\_k}$; otherwise set $\delta_{jk}$ to a large value $\Theta$. Again, M represents a general scaling factor that can be adjusted to achieve the maximal capacity gain.

3) Let $(J,K)=\arg\min(\delta_{jk})$ for each access node $j=0, \ldots, M_r$ and sector $k=1, \ldots, M_c$ and $\zeta=\min(\delta_{jk})$ for each access node $j=0, \ldots, M_r$ and sector $k=1, \ldots, M_c$, i.e. $(J,K)$ is the access node that requires the least bandwidth and is the required bandwidth at that node.

a. If $\zeta<\Theta$, the UE device is granted access.

i. If $J=0$, the UE device is associated with the BS in sector K and the system updates the variables for bandwidth available at the BS, $\Omega_{0k}(t+1)=\Omega_{0k}(t)-C_{d\_i\_K}$ and bandwidth used at the BS, $\Psi_{10k}(t+1)=\Psi_{10k}(t)+C_{d\_i\_k}$.

ii. If $J>0$, the UE device is associated with RN J within sector K and the system updates the variables for bandwidth available at the BS $\Omega_{0k}(t+1)=\Omega_{0k}(t)-C_{b\_i\_J\_K}$, bandwidth available at the RN, $\Omega_{JK}(t+1)=\Omega_{JK}(t)-C_{a\_i\_J\_K}-C_{b\_i\_J\_K}$; bandwidth used at the BS, $\Omega_{0k}(t+1)=\Psi_{0k}(t)+C_{b\_i\_J\_K}$, and bandwidth used at the RN, $\Psi_{2JK}(t+1)=\Psi_{2JK}(t)+C_{a\_i\_J\_K}+C_{b\_i\_J\_K}$.

b. If $\zeta=\Theta$, i. If low_threshold>0, set low_threshold=0 and go back to 2)

ii. If low_threshold=0, the node is rejected.

The three methods shown in FIGS. 3-5 enable a wireless communication system, such as RAN 100 shown in FIG. 1A, to manage UE device access control and load balancing.

These methods can be used to allow wireless UE devices to attach to an access node in a manner that best utilizes the network resources while still satisfying the UE device's performance need. These methods can be used for wireless UE devices in both an active state and an idle state. An idle state is generally defined as a state in which the wireless UE device is in a standby mode and not engaged in active communications while an active state is generally defined as a state in which the wireless UE device has a connection set up and has active communications. If a UE device is in an active state, the proposed methods mainly reside on the eNB/RN side and will be executed by the eNB/RN. It is also possible that part of the algorithm used for access control and load balancing is in the wireless UE device and part of the algorithm is on the eNB/RN by doing distributed processing. The use of distributed processing may reduce the signaling overhead. If a wireless UE device is in idle state, the proposed algorithm can reside in the wireless UE device by using information broadcast from the eNB/RN.

Figure 6:
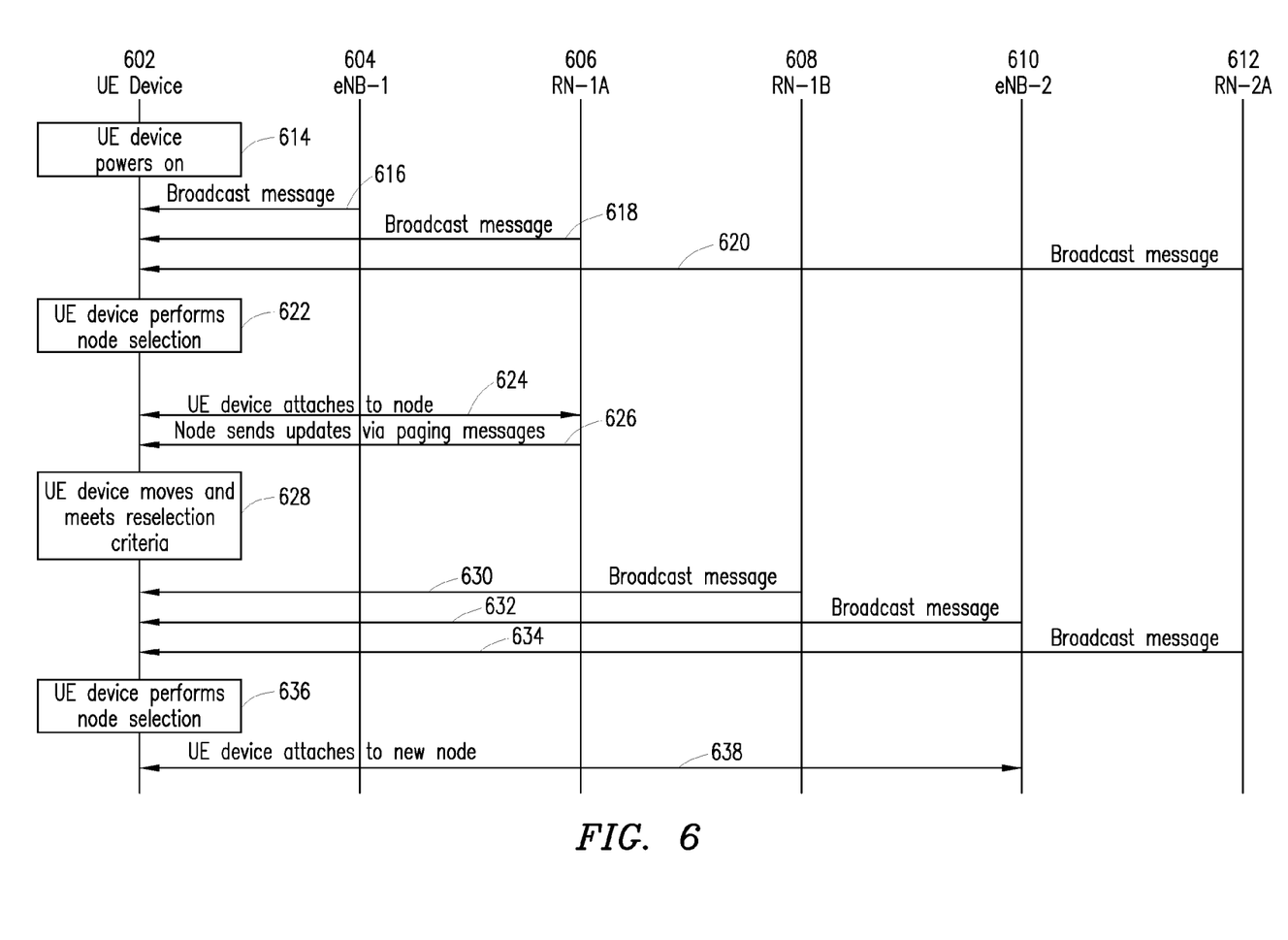
FIG. 6 depicts a signal exchange between an UE device and a radio access network according to an embodiment of the present disclosure.
Figure 7:
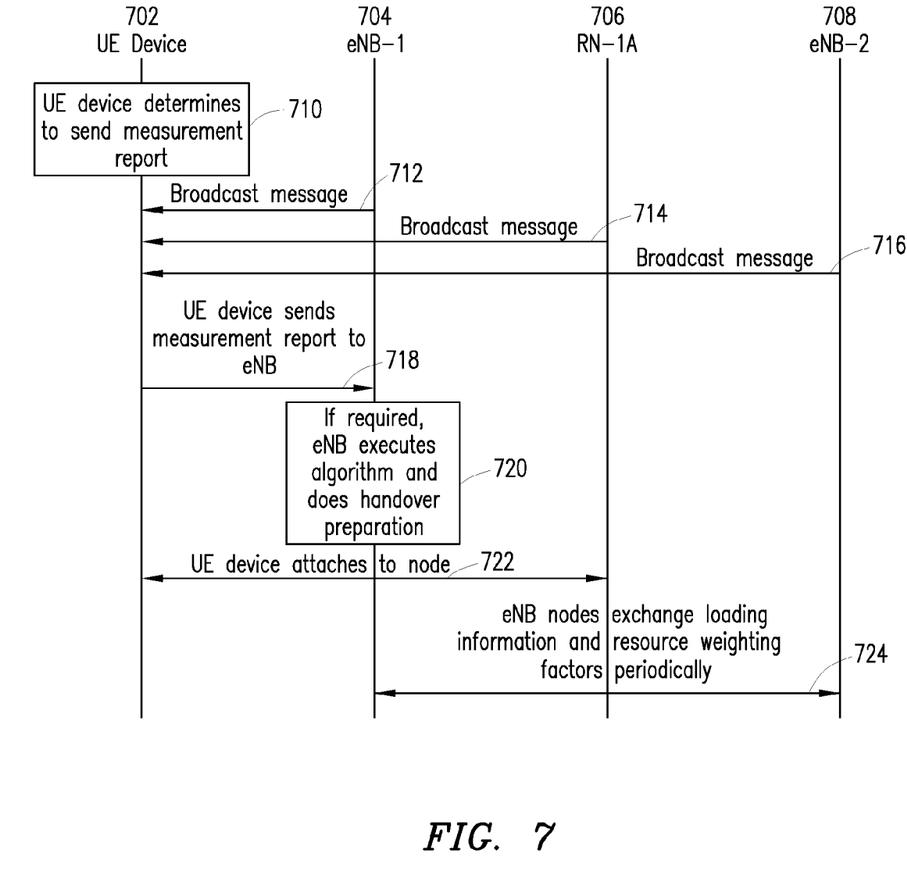
FIG. 7 depicts a signal exchange between an UE device and a radio access network according to an embodiment of the present disclosure.
Figure 8:
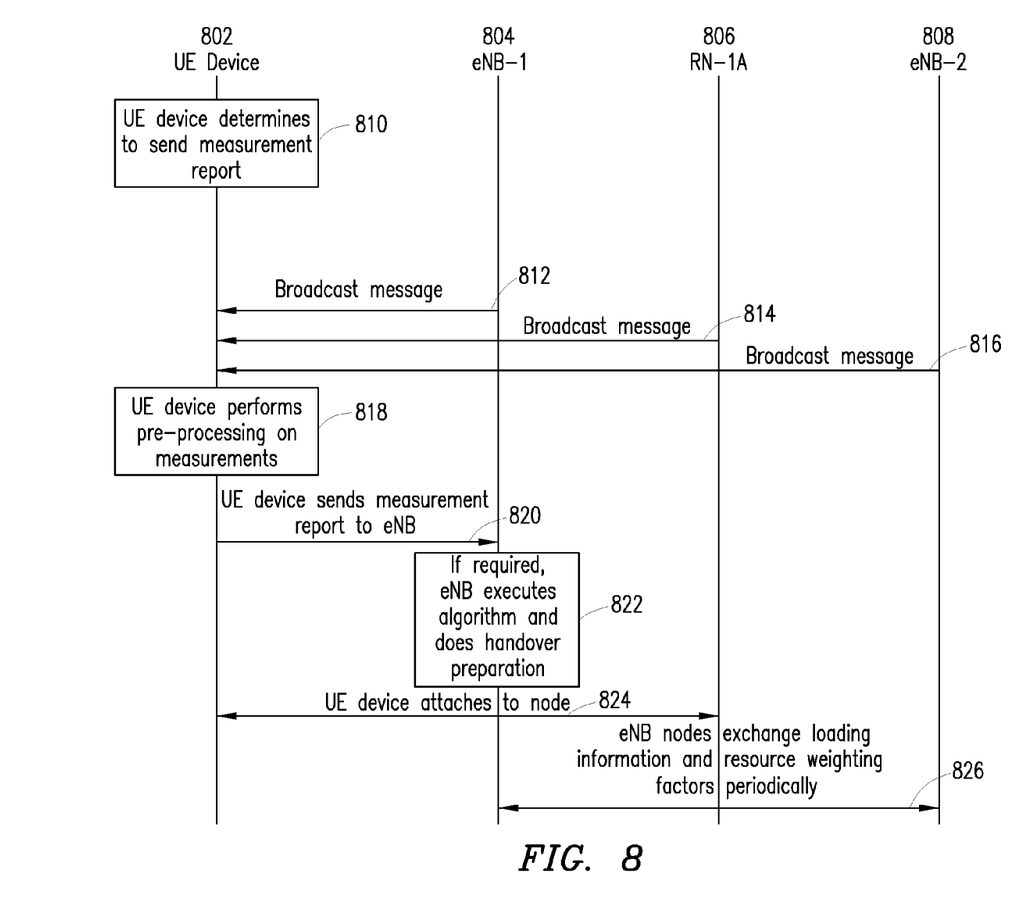
FIG. 8 depicts a signal exchange between an UE device and a radio access network according to an embodiment of the present disclosure.

In order to implement the disclosed methods, appropriate signaling exchanges are necessary between the eNB/RN and a wireless UE device, as shown in FIGS. 6-8. Referring now to FIG. 6, an embodiment of the signal exchanges for a wireless UE device in idle mode is disclosed. Initially, the wireless UE device is powered on at 614. The UE device then performs a scan to determine those attachment nodes that the UE device is able to detect. In this example, UE device 602 is able to receive broadcast message 616 from eNB-1 604, broadcast signal 618 from RN-1A 606, which is attached to eNB-1, and broadcast message 620 from RN-2A 612, which is attached to eNB-2 610. Each of access nodes 604-612 provides a broadcast message that gives the load conditions of at least the eNB to which the access node is connected and the RNs associated with that eNB, as well as the weighting factors to use with each segment, e.g., for eNB access connection, for RN access connection and for wireless backhaul. The broadcast message may also contain similar information for neighboring eNBs and their RNs. The broadcasting information is usually sent out periodically, for example, every 100 milliseconds. The information could be semi-static, for example, averaged loading information. Once UE device 602 receives the broadcast information, the UE device can start the cell selection or reselection based on one of the proposed algorithms at 622. In the example illustrated in this figure, wireless UE device 602 successfully camps on RN-1A 606, as illustrated by the two-way exchange 624 between UE device 602 and RN-1A 606, although this exchange can require additional messages. In another embodiment, since the UE is in the idle mode, there is no message exchange between the UE device and the network. The exchange 624 only indicates that the UE device is camped on the RN. Once the UE device is attached to a node after node selection, any updates on the load conditions and weighting factors can be provided to the UE device via paging messages 626 or via the broadcast message. As an example, in an LTE system, the broadcast can be carried in a System Information Block (SIB). In the example illustrated in this figure, the UE device moves to a new location while in idle mode, at 628, and receives broadcast messages from a different set of access nodes. In the example of FIG. 6, the UE device receives broadcast message 630 from RN-1B, which is connected to eNB-1, broadcast message 632 from eNB-2, and broadcast message 634 from RN-2A, which is connected to eNB-2. Having received the load conditions and weighting factors for this new set of access nodes, the UE device performs node selection at 636 using one of the disclosed methods and attaches, via attachment process 638, to a new node, which in this example is eNB-2.

Referring now to FIG. 7, an embodiment of the signal exchanges for a wireless UE device in active mode is disclosed. In this embodiment, the algorithm to provide access and load balancing is performed at the network, either by the eNB or by the RN to which the UE device is currently attached. In the example illustrated in this figure, UE device 702 is attached directly to eNB-1 704. In an LTE-A network, the information broadcast by the eNB includes a measurement configuration that directs the UE devices to provide measurement reports for a set of access nodes to the eNB. These measurement reports can be either event based or timer based. In this figure, UE device 702 determines at 710 that measurement reports should be sent to eNB 704 and determines the cells that should be measured according to the measurement configuration. In another embodiment, the UE could determine the cells that should be measured by other means, for example, the UE could determine that signals can be received via broadcast message 712 from eNB-1, broadcast message 714 from RN-1A, and broadcast signal 716 from eNB-2. After determining the cells that should be measured, the UE device then sends the measurement report to the eNB at 718. The eNB and the relay nodes connected to the eNB share information with each other on their current load conditions, although these connections are not specifically shown. On receiving the measurement report, the eNB can evaluate the measurements to determine whether a handover is desirable for the UE device (not specifically shown). If a handover is required, the eNB executes node selection on behalf of the UE device using one of the algorithms in this disclosure and performs network-directed handover preparation at 720. UE device 702 attaches, at 722, to a new access node, which in this example is RN-1A. As a further part of the background information exchange for load balancing in the network, eNBs 704 and 708 periodically exchange loading information and resource weighting factors via messages 724.

In an alternate embodiment for access control and load balancing for a wireless UE device in active mode, part of the algorithm resides on the UE device and part of the algorithm resides on the eNB/RNs using distributed processing, as illustrated in FIG. 8. In this embodiment, the eNB again broadcasts a measurement configuration that directs the UE devices to provide measurement reports to the eNB. The broadcast information also provides information regarding the load at various access nodes and the weighting factors that should be used with each segment of the network. UE device 802 is in an active state and connected to the network via eNB-1 804 when the UE device determines that a measurement report should be sent to the eNB at 810. The UE device receives broadcast message 812 from eNB-1 804, broadcast message 814 from RN-1A 806 and broadcast message 816 from eNB-2 808. The UE device performs pre-processing on the measurements at 818 and sends the measurement report to the eNB to which the UE device is attached at 820. The eNB is then able to determine whether a handover is desirable for the UE device (not specifically shown). If a handover is desirable, the eNB executes one of the algorithms disclosed herein and does handover preparation at 822. The UE device is then able to attach to a new node at 824, which in the example is RN-1A. As in the previous example, eNBs 804, 808 exchange loading information and resource weighting factors with each other periodically at 826. Providing distributed processing, as disclosed in the current embodiment, may improve the handover measurement accuracy and reduce the reporting load on the air interface that is due to handover measurements. In an LTE system, for example, the information can be exchanged between nodes via the X2 interface or via RRC signaling on the wireless backhaul and SIB information can be broadcast to the wireless UE devices.

The LTE standards support several different types of load balancing, including MME load balancing, camp balancing and traffic load balancing. Section 19.2.1.9 of 3GPP TS 36.300 states that Mobility Management Entity (MME) load balancing can be supported by indicating the relative MME capacity in the S1 setup procedure to all eNBs served by the MMEs of the pool area per MME. The disclosed UE device association and load balancing methods are different from the MME load balancing in the following aspects:

1. MME load balancing aims to distribute UEs newly entering the pool to different MMEs in the MME pool so that load balancing among different MMEs can be achieved. The disclosed embodiments aim to distribute UEs among different eNBs and relays so that load balancing can be achieved among them.
2. MME load balancing can be indicated via S1 path set up and each eNB will be notified. The disclosed embodiments rely on the adding new fields in the SIB on air interface or in the X2/RRC signaling exchange over the backhaul connections. It does not change any existing messages flows.
3. MME load balancing is done among MMEs while the disclosed embodiments do load balancing among eNBs and RNs.
4. MME load balancing will work together with the disclosed embodiments to achieve different levels of load balancing. One will not interfere with the other.

With regard to camp load balancing, the goal is to distribute idle state UEs among the available bands, carriers and radio access technologies (RATs) such that upon activation, the traffic loading of the bands, carriers and RATs is balanced. A deliberate mechanism would be necessary to avoid UE devices concentrating to a certain RAT, e.g., E-UTRAN, or certain frequency layers, e.g., lower frequency bands due to the propagation nature. Various solutions have been presented including the use of Qoffset and an approach of limiting the frequency layers for camping in the current LTE specification. The proposed load balancing in idle state is different from camp load balancing in the following aspects:

1. Camp load balancing is applied only for inter-frequency and inter-RAT cell selection and reselection (see Table E-1 of Spec TS36.300). The disclosed embodiments can be applied to cell selection and reselection in all cases, including intra-frequency, inter-frequency and inter-RAT.
2. The disclosed embodiments work more like cell selection and reselection based on the radio channel condition. However this channel condition is adjusted based on the algorithm proposed by using extra broadcasting information received from air interface.
3. The camp load balancing works in the level of frequency layer or inter-RAT layer while the disclosed embodiments work among eNBs. So it works on top of camp load balancing and provide extra load balancing among eNBs and relays.
4. The camping load condition does not consider the backhaul between the eNB and the relay node.

The goal of traffic load balancing is to balance the loading of active state UEs using redirection, for example. The disclosed active state load balancing is different from traffic load balancing in the following aspects:

1. Traffic load balancing is applied only for inter-frequency and inter-RAT cell (see Table E-1 of Spec TS36.300). The disclosed embodiments can be used in intra-frequency, inter-frequency and inter-RAT.
2. In either distributed or centralized load balancing, the UE may need to get extra broadcasting information from SIB to provide more accurate measurement reports to the eNB. The eNB needs to exchange load information and bandwidth weighting factors on the backhaul to make better handover decision.
3. The disclosed embodiments can work on top of the traffic load balancing to provide extra load balancing among eNBs.

Figure 9:
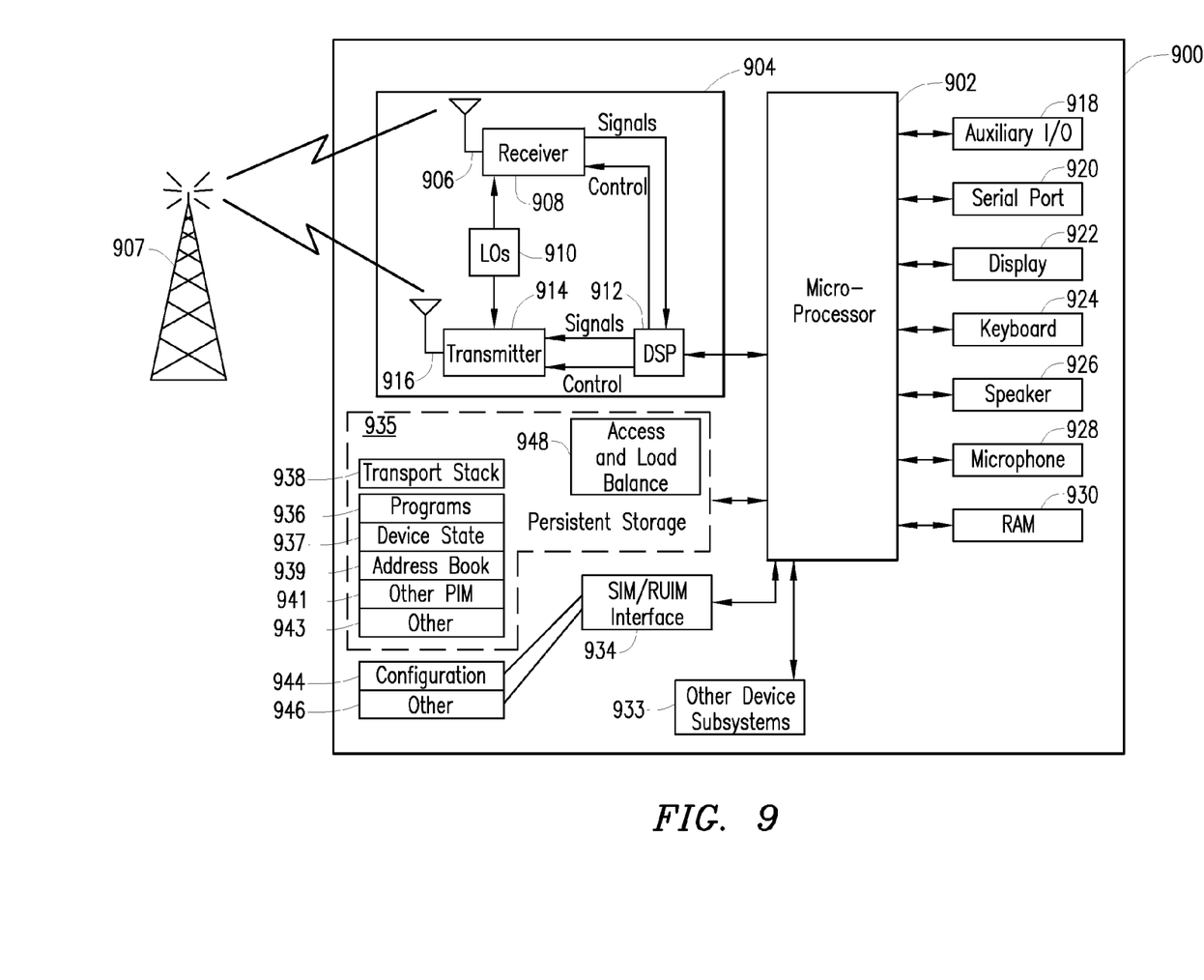
FIG. 9 depicts a block diagram of a User Equipment (UE) device according to an embodiment of the present disclosure.

FIG. 9 depicts a block diagram of an embodiment of a communication device 900 operable as an UE device, e.g., one of UE devices 115 of FIG. 1A, for purposes of the present patent disclosure. A microprocessor 902 providing for the overall control of an embodiment of the UE device is operably coupled to a communication subsystem 904 that is capable of operation on multiple bands and in multiple access technologies as necessary. The communication subsystem 904 generally includes one or more receivers 908 and one or more transmitters 914 as well as associated components such as one or more local oscillator (LO) modules 910 and a processing module such as a digital signal processor (DSP) 912. As will be apparent to those skilled in the field of communications, the particular design of communication module 904 may be dependent upon the bands and access technologies with which the UE device is intended to operate (e.g., CDMA, GSM, WLAN, LTE-A, et cetera). Regardless of the particular design, however, signals received by antenna 906 through appropriate access infrastructure are provided to receiver 908, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 912, and provided to transmitter 914 for digital-to-analog (D/A) conversion, frequency up conversion, filtering, amplification and transmission over the air-radio interface via antenna 916. In at least one embodiment, communication module 904 may be duplicated so that UE device 900 is able to operate on several bands simultaneously and may have the capability to operate using multiple-inputs, multiple-outputs (MIMO). In some implementations of the communications modules 904, the receive antenna 906 and the transmit antenna 916 may be combined into a single apparatus and appropriately coupled to the receiver 908 and the transmitter 914. Some implementations may also include multiple antennae for improved performance using techniques such as diversity.

Microprocessor 902 may also interface with further device subsystems such as auxiliary input/output (I/O) 918, serial port 920, display 922, keyboard/keypad 924, speaker 926, microphone 928, random access memory (RAM) 930 and any other device subsystems, e.g., timer mechanisms, generally labeled as reference numeral 933. To control access, an interface 934 may also be provided in communication with the microprocessor 902 with respect to a removable storage module (Universal/Subscriber Identity Module (U/SIM) or Removable User Identity Module (RUIM)). In one implementation, U/SIM or RUIM interface 934 may be operable with a U/SIM or RUIM card having a number of key configurations 944 and other information 946 such as default content disposition profiles, policy managers, alternative network information, as well as identification and subscriber-related data that may supplement local storage-based information.

Operating system software and applicable service logic software may be embodied in a persistent storage module (i.e., non-volatile storage) such as Flash memory 935. In one implementation, Flash memory 935 may be segregated into different areas, e.g., storage area for computer programs 936 (e.g., service processing logic), as well as data storage regions such as device state 937, address book 939, other personal information manager (PIM) data 941, and other data storage areas generally labeled as reference numeral 943. In addition, an access and load balance module 948 is provided for facilitating one or more embodiments as set forth in detail herein. Access and load balance module 948 includes logic for receiving the broadcast information regarding loading on the access nodes and weighting factors associated with each possible connection in the system and for attaching to a selected node. Module 948 also contains logic to perform one of the load balance algorithms disclosed herein as part of the process of access node selection. Access and load balance module 948 has the capability to perform one of the disclosed load balancing algorithms when operating in idle mode. In at least one embodiment, module 948 is also operable to provide at least a portion of the calculations necessary for access node selection and load balancing while in active mode.

Figure 10:
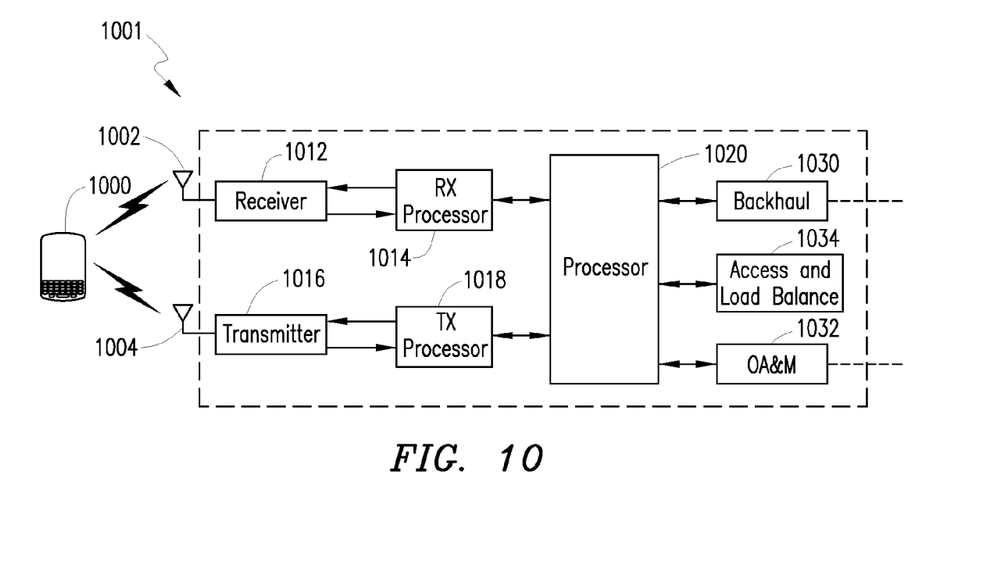
FIG. 10 depicts an example network node at which an embodiment of the present disclosure can be practiced.

With reference now to FIG. 10, a block diagram of a wireless base station 1001, which can be any of eNBs 105 in RAN 100, is disclosed. The wireless base station 1001 communicates with a plurality of wireless UE devices 1000 located in the service region. A receiver 1012 is coupled to one or more receive antennas 1002 for processing signals from the wireless UE devices. Signals from wireless UE devices received by antenna 1002 are input to receiver 1012, which may perform common receiver functions as signal amplification, frequency down conversion, filtering, channel selection and analog to digital (A/D) conversion. A/D conversion of a received signal allows more complex communication functions such as demodulation, decoding and synchronization to be performed in the receive processor 1014. In the transmission path, one or more transmit antennas 1004 are coupled to a transmitter 1016. The transmitter 1016 provides frequency up-conversion including modulation, amplification and transmission of the communication to wireless UE device 1000. Digital to analog conversion and encoding can be performed by transmit processor 1018. The processor 1020 provides additional processing of the received and transmitted signals and interfaces with backhaul interfaces 1030 and with operations, administration and management (OA&M) module 1032 that interfaces with the rest of the wireless network. Access and load balance module 1034 is provided for facilitating one or more embodiments as set forth in detail herein. Access and load balance module 1034 includes logic for sending the broadcast information regarding loading on the access nodes and weighting factors associated with each possible connection in the system and logic to receive a measurement report from a UE device, the measurement report containing measurements of a plurality of signals from a plurality of access nodes. Module 1034 also includes logic to determine a preferred access node for the UE device using one of the load balance algorithms disclosed herein as part of the process of determining whether handover to a new access node is indicated and performing the handover. In some embodiments, the UE device performs at least a portion of the calculations necessary for access node selection and load balancing. Module 1034 can receive the results of these calculations and determine an access node for handover of the UE device.

Various processes, structures, components and functions set forth above in detail, associated with one or more network nodes or a wireless UE device, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

In summary, the current disclosure provides a method, access node, UE devices and computer program product for performing access control and load balancing among base stations and relay nodes within a wireless radio access network. It will be recognized that this type of load balancing can also be extended to other access nodes, such as pico-cells and Home eNBs. It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A wireless user equipment (UE) device comprising:
a processor operably connected to a communication subsystem and to a memory containing instructions that when executed by the processor, perform the actions of:
receiving a message from a base station in a wide area cellular network (WACN), the message comprising weighting factors for a plurality of possible connections to a plurality of access nodes, the plurality of access nodes comprising the base station and at least one relay node, the weighting factors supporting load balancing between the base station and the at least one relay node;
determining a preferred access node using the weighting factors in order to maximize a number of UE devices the network is able to serve; and
attaching to the preferred access node such that wireless communication via the WACN is facilitated.

2. The wireless UE device of claim 1, wherein the instructions are executed on the UE device during idle mode.

3. The wireless UE device of claim 2, wherein the message further comprises respective loads for the plurality of access nodes and the instructions select an access node resulting in a least respective load.

4. The wireless UE device of claim 3, wherein the respective load of a first relay node is determined based on an existing load of the first relay node and a combination of a first weighting factor applied to a load on the first relay node for a connection to the UE device and a second weighting factor applied to a load on the first relay node for a backhaul connection to a respective base station and the respective load of the base station is determined based on an existing load of the base station and a third weighting factor applied to a load on the base station for a connection to the UE device.

5. The wireless UE device of claim 4, wherein execution of the instructions is distributed between the UE device and the base station during active mode.

6. The wireless UE device of claim 2 wherein the instructions select an access node requiring the least resources to serve the UE device.

7. The wireless UE device of claim 6, wherein the resources for a first relay node to serve the UE device are determined based on a first weighting factor applied to resources for a connection to the UE device and a second weighting factor applied to resources for a backhaul connection to a respective base station in support of the UE device and the resources for the base station to serve the UE device are determined based on a third weighting factor applied to resources for a connection to the UE device.

8. The wireless UE device of claim 7, wherein the method is distributed between the UE device and the base station during active mode.

9. The wireless UE device of claim 2, wherein the instructions select an access node having at least a minimum signal to noise and interference ratio that requires the least resources to serve the UE device.

10. A method operable on a wireless user equipment (UE) device, the method comprising:
receiving from a base station in a wide area cellular network (WACN), the message comprising weighting factors for a plurality of possible connections to a plurality of access nodes, the plurality of access nodes comprising the base station and at least one relay node, the weighting factors supporting load balancing between the base station and the at least one relay node;
determining a preferred access node using the weighting factors in order to maximize a number of UE devices the network is able to serve; and
attaching to the preferred access node such that wireless communication via the WACN is facilitated.

11. The method of claim 10, wherein the method is performed on the UE device during idle mode.

12. The method of claim 11, wherein the message further comprises respective loads for the plurality of access nodes and determining a preferred access node comprises selecting an access node that results in a least respective load.

13. The method of claim 12, wherein a respective load for a first relay node is determined based on an existing load of the first relay node and a combination of a first weighting factor applied to a load on the first relay node for a connection to the UE device and a second weighting factor applied to a load on the first relay node for a backhaul connection to a respective base station in support of the UE device and a respective load of the base station is determined based on an existing load of the base station and a third weighting factor applied to a load on the base station for a connection to the UE device.

14. The method of claim 13, wherein the method is distributed between the UE device and the base station during idle mode.

15. The method of claim 11, wherein determining a preferred access node comprises selecting an access node requiring the least resources to serve the UE device.

16. The method of claim 15, wherein resources for a first relay node to serve the UE device are determined based on a first weighting factor applied to resources for a connection to the UE device and a second weighting factor applied to resources for a backhaul connection to a respective base station in support of the UE device and the resources for the base station to serve the UE device are determined based on a third weighting factor applied to the resources for a connection to the UE device.

17. The method of claim 16, wherein the method is distributed between the UE device and the base station during active mode.

18. The method of claim 11, wherein determining the preferred access node comprises selecting an access node having at least a minimum signal to noise and interference ratio that requires the least resources to serve the UE device.

19. A computer program product stored on a non-transitory computer-readable media and operable for execution on a wireless user equipment (UE) device, the computer program product comprising:
instructions for receiving a message from a base station in a wide area cellular network (WACN), the message comprising weighting factors for a plurality of possible connections to a plurality of access nodes, the plurality of access nodes comprising the base station and at least one relay node, the weighting factors supporting load balancing between the base station and the at least one relay node;
instructions for determining a preferred access node using the weighting factors in order to maximize a number of UE devices the network is able to serve; and
instructions for attaching to the preferred access node such that wireless communication via the WACN is facilitated.

20. The computer program product stored on a non-transitory computer-readable media of claim 19, wherein the instructions are executed on the wireless UE device during idle mode.

* * * * *